United States Patent [19]

Krapf

[11] Patent Number: 4,584,223
[45] Date of Patent: Apr. 22, 1986

[54] MAGNETIC DISPLAY PANELS

[76] Inventor: Wallace A. Krapf, 25 Berkley St., Rochester, N.Y. 14607

[21] Appl. No.: 622,579

[22] Filed: Jun. 20, 1984

[51] Int. Cl.⁴ .............................................. G09B 29/00
[52] U.S. Cl. ..................... 428/58; 428/192; 428/201; 428/215; 428/304.4; 428/317.1; 428/318.4; 428/455; 428/464; 428/900; 434/430
[58] Field of Search ................ 434/430; 428/900, 192, 428/215, 304.4, 317.1, 317.9, 332, 455, 464, 692, 58, 201, 318.4; 40/600

[56] References Cited

U.S. PATENT DOCUMENTS

| 3,093,919 | 6/1963 | Holtz | 428/900 |
| 3,298,124 | 1/1967 | Jahn | 428/900 |
| 3,456,373 | 7/1969 | Epton | 428/900 |
| 3,549,463 | 12/1970 | Frech | 428/900 |
| 3,619,313 | 11/1971 | Sznch | 428/900 |
| 3,654,711 | 4/1972 | Taylor | 428/900 |
| 3,716,935 | 2/1973 | Friederichs | 434/430 |
| 3,726,026 | 4/1973 | Borcherding | 434/430 |
| 3,751,839 | 8/1973 | Mitchell | 428/900 |
| 3,839,130 | 10/1974 | Dean et al. | 428/900 |
| 4,507,888 | 4/1985 | Robinson et al. | 428/900 |

FOREIGN PATENT DOCUMENTS

| 2307324 | 12/1976 | France | 434/430 |
| 7514133 | 6/1977 | Netherlands | 434/430 |
| 2032671 | 5/1980 | United Kingdom | 40/600 |
| 2128104 | 4/1984 | United Kingdom | 434/430 |

Primary Examiner—George F. Lesmes
Assistant Examiner—William M. Atkinson
Attorney, Agent, or Firm—Shlesinger, Fitzsimmons & Shlesinger

[57] ABSTRACT

The panel has a light, generally rigid cardboard or foamed cork core to opposite sides of which are laminated two, thin sheets of steel foil ranging from 2 to 5 mils in thickness. Paper sheets are secured to and cover the outer surfaces of the steel foil; and these sheets have transparent plastic covers secured thereover. The panel has an overall thickness of less than 0.1" and weighs less than one pound per square foot—e.g. approximately 7 oz./sq. ft. The edges of the panel are covered by strips of molding to prevent injury from the sharp edges of the steel foil and to prevent damage to the panel. Magnetically-backed symbols are releasably attachable to the plastic cover layers, which also are adapted to have erasable graphics marked thereon by liquid crayon or the like.

7 Claims, 4 Drawing Figures

MAGNETIC DISPLAY PANELS

BACKGROUND OF THE INVENTION

This invention relates to magentic display boards or panels, and more particularly to panels or boards of the type to which magnetically-backed symbols are adapted to be releasably attached for scheduling purposes or the like. Even more particularly this invention relates to an improved board or panel of the type described which is substantially lighter, more inexpensive to manufacture and more readily portable as compared to prior such boards or panels.

Heretofore it has been customary to manufacture magentic display panels of the type described from rather thick, heavy, rigid boards, such as particle boards, which are used as the cores of the panels. Typically it has been the practice to secure to opposite sides of the particle board a pair of steel sheets which may measure anywhere from 23 to 28 mils in the thickness. Boards of this type are suitable for use with magnetically-backed symbols, such as for example numerals, letters, product images, etc., which can be releasably attached by a magnetic attraction to the surfaces of the steel sheets, and also provide plane, hard or firm surfaces on which graphics may be printed or inscribed. In those instances where it is desired to use only one side of the board, it has been customary to replace one of the steel sheets with a layer of aluminum foil, thereby reducing both the cost and the weight of the panel. In any case, however, most such prior panels, whether manufactured for use on one or both sides, have customarily been extremely bulky and heavy, e.g. on the order of from ½" to 1¼" thick, and have been difficult to manipulate.

For the above reasons it heretofore has been necessary to provide such prior art boards or panels with extremely sturdy mounting brackets or frameworks for supporting the boards during use. For example, if the board is to be hung on a wall it must be securely mounted so that it does not accidentally topple and injure someone. If it is to be used as a free-standing scheduling board, it has been customary to mount the board on a very sturdy, perhaps wheel-mounted framework. In those instances where such boards are hinged along one side to be able to be swung into and out of operative positions, it has been necessary to employ rather sturdy and expensive hinges for mounting purposes.

Moreover, such conventional boards are too heavy to be portable because of the weight of their steel sheets. They must therefore be supported in upright positions and cannot be easily carried to a meeting, or be laid on a desk to facilitate working on them from a seated position.

It is an object of this invention, therefore, to provide an improved magnetic panel or scheduling board of the type described which is substantially lighter, easily portable, and more inexpensive to manufacture than prior such boards.

Another object of this invention is to provide improved magnetic scheduling boards or panels of the type described which are so thin and light that they can be mounted as pages in a loose leaf binder, or the like, and can be easily stacked and condensed for storage.

Still another object of this invention is to provide an improved magnetic panel or scheduling board which is extremely thin and light, as compared to prior such panels, and yet exhibits sufficient rigidity and surface hardness to function as a substitute for prior such boards.

Other objects of the invention will be apparent hereinafter from the specification and from the recital of the appended claims, particularly when read in conjunction with the accompanying drawing.

SUMMARY OF THE INVENTION

A very thin (e.g. 1/64" to 1/32" thick), slightly flexible, planar core is made from a very light material, such as Styrafoam, foam cork, cardboard, or the like, which has or is made to have a surface hardness that resists indentation. Laminated or otherwise secured to the opposed, plane surfaces of the core are two, very thin layers of material, at least one of which, and preferably each of which, comprises a layer of steel foil ranging in thickness anywhere from approximately 2.0 mils for small panels to 5.0 mils for large panels. Laminated over the outer surfaces of the foil layers are thin sheets or opaque paper upon wich graphic grids or other graphics are printed; and then at least one and preferably both of these sheets are then covered or over-laminated with a transparent plastic which will allow erasable writing thereon and the use of magnet elements. Alternatively the foil layers are covered with sheets of opaque plastic upon which grids or other graphics are printed, and upon which magnets may be used to present a movable scheduling picture. In any case the outermost plastic sheets preferably are of the type that can be marked with, for example, erasable inks, chalks, etc.

The sheets of foil are so thin that their marginal edges tend to be somewhat very sharp, particularly after they have been laminated to the core material. For this reason the outer edges of the assembly preferably are bound with tape or are enclosed in protective, plastic molding strips or framing material.

A particularly suitable way for securing the steel foil to the core substrate is to utilize double sided adhesive layers, which are interposed between the core material and the layers of foil. Although the several laminated layers are individually, quite flexible, once they are laminated together they produce a substantially more rigid, less flexible assembly.

THE DRAWING

DETAILED DESCRIPTION OF THE PREFERRED EMBODIMENTS

Figure 1:
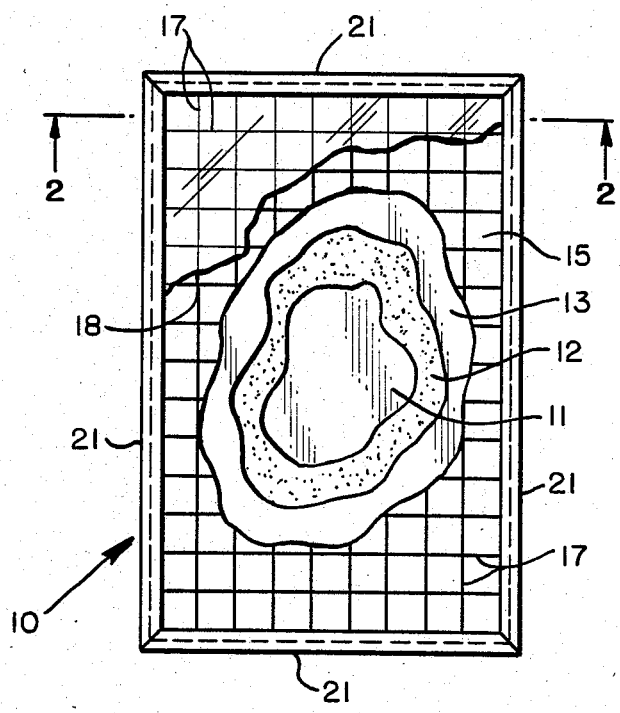
FIG. 1 is a front elevational view of a laminated, magnetic scheduling board or panel made according to one embodiment of this invention, portions of the board being cut away for purposes of illustration.
Figure 2:
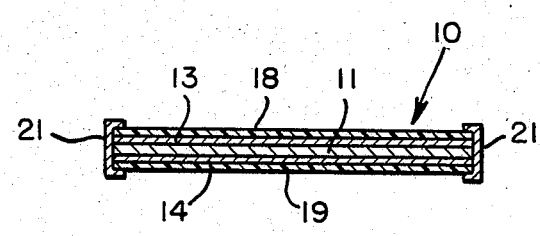
FIG. 2 is a sectional view of this board taken generally along the line 2—2 in FIG. 1 looking in the direction of the arrows.

Referring now to the drawing by numerals of reference and first to FIGS. 1 to 3, 10 denotes generally an improved, magnetic panel or scheduling board which is rectangular in configuration. Board 10 comprises a central, rectangularly shaped, generally rigid core or substrate 11, which can be made from a thin layer (for example in the range of approximately 1/64"–1/32"

thick) of a foam cork material, cardboard, or similar such material which is relatively light, sturdy, flexible to a degree, and the opposed, plane surfaces of which are extremely firm, so that they do not tend readily or easily to become indented.

Laminated or otherwise secured by adhesive layers 12 (FIG. 3) to opposite sides, respectively, of the core 11 are two, very thin layers 13 and 14 of steel foil, which by way of example may range in thickness anywhere from 2 to 5 mils. When the steel foil layers are in the vicinity of 5.0 mils thick the problem of undesirable indentation is reduced considerably and is minimized, provided that the external surfaces of the core 12 have the above-noted required firmness. Steel foils which have proved to be suitable for use with this invention include thin, cold rolled steel sheets.

Laminated over the outer surfaces of the steel foil layers 13 and 14 are thin sheets 15 and 16, respectively, of opaque paper, the outer surfaces of which have inscribed thereon intersecting grid lines 17 (FIG. 1), and other graphics as may be desired. Laminated over the paper sheets 15 and 16 are layers 18 and 19, respectively, of a transparent plastic material capable of having applied thereto liquid inks, chalks, paints, pencil marks, and other such materials, which can be employed for inscribing erasable information and/or graphics on the opposed surfaces of the panel 10. Layers 18 and 19 are transparent so that the grid lines 17 and other graphics inscribed on the outer surfaces of the paper sheets 15 and 16 will be visible.

Alternatively, the paper sheets 15 and 16 may be eliminated, and the plastic sheets 18 and 19 may be laminated directly to the foil layers 13 and 14, in which case it is preferred that the plastic layers be opaque. Regardless, however, whether or not the paper sheets 15 and 16 are employed, the outermost plastic sheets are designed to have erasable information marked thereon, and also are designed to have magnetically backed symbols removably secured thereto in known manner.

Among the materials found to be suitable for the core is a product which is sold by Amoco Foam Products of Atlanta, Georgia under the trademark "Artcore". As suggested above, this core material may have a thickness in the range of 1/64"–1/32", and after the steel foil layers 13 and 14 have been laminated thereto, the assembly exhibits a surprising amount of increased rigidity and strength as compared to the rigidity and strength exhibited by the layers 11, 13 and 14 when examined independently of each other. Depending upon the type of materials employed for the outer layers 15 and 16 and/or 18 and 19, this rigidity and strength may be enhanced even further.

After the layers 11–19 have been formed into a laminated assembly they can be trimmed, for example by scissors, or can be die cut into any desired shapes, such as for example the rectangular configuration as shown in FIG. 1. Thereafter the sharp outer edges of the assembly are bound with tape or enclosed in strips 21 of a plastic molding material, or the like, which as shown in the drawing may be generally U-shaped in cross section. The strips 21 of molding not only tend to protect the marginal edges of the laminated assembly, but also protect individuals against being cut by the rather sharp edges of the foil layers 13 and 14. Moreover, they act as spacers to keep magnets on adjacent panels from touching each other.

Figure 4:
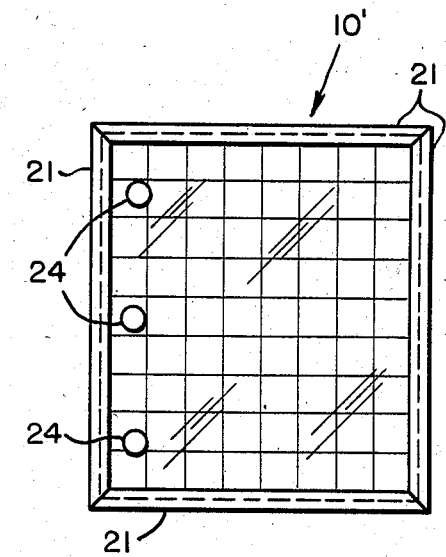
FIG. 4 is a front elevational view of another embodiment of this board.
Figure 3:
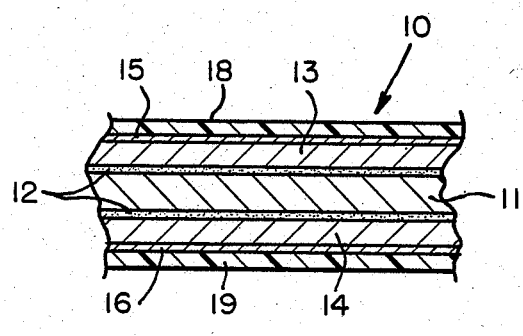
FIG. 3 is a greatly enlarged view of a portion of this bar as shown in FIG. 2.

In use the panels can be designed for a variety of uses, such as for example as loose-leaf pages 10', as shown in FIG. 4. In such case the laminated assembly would also be bound with the molding strips 21, and would have formed therethrough adjacent one of its edges a plurality of spaced apertures 24 for use in mounting the panel 10' in a loose-leaf binder, or the like. Other uses, such as laminating the assembly to fiber glass substrates, or using the panels with plastic hinges in a portfolio or the like will be readily apparent to those skilled in the art. In each instance the opposed surfaces of the laminated assemblies can be used for removably supporting thereon magnetically backed symbols, and also can be designed to have marked thereon information or graphics by conventional inks, paints, etc.

For best results the surfaces of the steel foil layers 13 and 14 should be cleaned before assembly to remove any undesirable oil films, or the like. Moreover, while it has been suggested generally that an adhesive 12 be employed for laminating together the core 11 and the opposed foil layers 13 and 14, it has been found that the steel foil sheets are difficult to handle during assembly, and therefore can perhaps be more easily adhered to the core 11 by utilizing double sided adhesive tape layers generally sold in rolls with one adhesive surface thereof covered with a removable strip of plastic material so that the exposed adhesive surface can be adhered to one side of core 11, for example, after which the protective strip of plastic can be removed from the other adhesive surface of the tape for bonding to one of the foil layers 13, 14.

As previously noted, the magnetic panels for scheduling boards made according to this invention are many times lighter than prior such boards, and yet exhibit the strength and rigidity which closely proximate that of known boards, such as for example those which utilize particle board cores and extremely thick (20 to 30 mils) steel sheets. Existing such panels, whether they be wall hung, free standing, or hinged, range in thickness from a low of approximately 0.422" to a high of 1.250". Such panels are too thick and heavy to be portable in a realistic sense; they can not be readily stacked or folded for storage, except by using extremely heavy hinges; and they can not be positioned on a desk or tabletop to permit one to work on them from a seated position. The primary reason for this is that they rely on extremely heavy sheet steel (on the order of 20 to 30 mils in thickness) to form the releasable gripping means for the magentically-backed elements adapted to be employed therewith. As a consequence, most known magnetic scheduling boards weigh any where from 1.75 to 4.5 lbs, per sq. ft.

In contrast to this conventional construction, applicant's novel panels usually are less than one tenth of an inch thick, for example in the range of approximately 0.056" to 0.095" thick, including the core, the steel foil sheets which are laminated to the core, and the outer or covering layers to which graphics and magnetically backed elements can be applied. As a consequence, applicant's panels weigh less than approximately one pound per sq. ft., for example in the vicinity of only 7.0 oz. per sq. ft., thus making them particularly suitable for use in a variety of sizes and configurations, including the looseleaf configuration of FIG. 4. Moreover such novel panels are extremely easy to stack and store, and very portable as compared to known such boards.

While this invention has been illustrated and described in detail in connection with only certain embodiments thereof, it will be apprent that it is capable of still further modification, and that this application is intended to cover any such modifications as may fall within the scope of one skilled in the art or the appended claims.

I claim:

1. A laminated magnetic display panel having an overall thickness of less than approxilately 0.1", and weighing less than approximately one pound per square foot, and comprising
   a core panel having opposed, plane, firm surfaces that are extremely resistant to indentation by marking pencils and the like,
   a pair of thin outer panels laminated, respectively, to the opposed surfaces of said core panel, and operatively increasing the rigidity and strength of said core panel, and
   a transparent plastic cover layer secured over at least one of said outer panels,
   at least said one outer panel comprising a layer of steel foil having a thickness in the approximate range of 2 to 5 mils, and operable releasably to retain magnetically-backed symbols against the outer surface of said plastic cover layer.

2. A magnetic display panel as defined in claim 1, including a protective strip of molding secured around the outer edge of said display panel at least to cover the periphery of said steel foil layer.

3. A magnetic display panel as defined in claim 1, wherein
   a layer of double sided adhesive tape is interposed between said core panel and each of said outer panels, and
   said plastic cover layer is made from a material capable of having graphics applied thereto by liquid inks, chalks, paints, pencil marks, and the like.

4. A magnetic display panel as defined in claim 1, wherein said core is made from foam cork material having a thickness in the range of 1/64" to 1/32".

5. A magnetic display panel as defined in claim 1, wherein each of said outer panels comprises a layer of steel foil.

6. A magentic display panel as defined in claim 5, including
   a pair of sheets of paper secured, respectively, to the outer surfaces of said steel foil layers, and having intersecting grid lines inscribed on their outer surfaces, and
   at least one of said transparent covers being sealingly secured over and covering each of said sheets of paper.

7. A magentic display panel as defined in claim 5, including a double sided adhesive tape layer interposed between each of said layers of steel foil and the side of said core to which it is laminated.

* * * * *